United States Patent
Meziache (10) Patent No.: US 9,083,487 B2
(45) Date of Patent: Jul. 14, 2015

(54) METHOD FOR TRANSMITTING AND RECEIVING ENCRYPTED DIGITAL INFORMATION WITH ENCRYPTED PARITY BITS AND RELATED SYSTEMS

(71) Applicant: STMICROELECTRONICS (ROUSSET) SAS, Rousset (FR)

(72) Inventor: Thierry Meziache, St Maximin la Sainte Baume (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 197 days.

(21) Appl. No.: 13/894,819

(22) Filed: May 15, 2013

(65) Prior Publication Data

US 2013/0315263 A1   Nov. 28, 2013

(30) Foreign Application Priority Data

May 23, 2012   (FR) ...................................... 12 54708

(51) Int. Cl.
*H04L 1/00* (2006.01)
*H04L 9/00* (2006.01)
*H04W 12/06* (2009.01)
*H04W 4/00* (2009.01)
*H04W 12/08* (2009.01)

(52) U.S. Cl.
CPC ............... *H04L 9/00* (2013.01); *H04L 1/0041* (2013.01); *H04L 1/0045* (2013.01); *H04W 4/008* (2013.01); *H04W 12/06* (2013.01); *H04W 12/08* (2013.01)

(58) Field of Classification Search
CPC ............ G11B 20/00086; G11B 2020/1222; G06F 11/1076; G06F 2211/007; H04L 9/0844; H04L 9/0869; H04L 9/12; H04L 2209/34; H04L 2209/12; H04L 1/0041; H04L 1/0045; H04L 9/00; H04W 12/06; H04W 12/08; H04W 4/16; H04W 4/008
USPC .......................................................... 714/800
See application file for complete search history.

(56) References Cited

U.S. PATENT DOCUMENTS

| | | | |
|---|---|---|---|
| 6,463,153 B1 * | 10/2002 | Sako et al. ..................... | 380/201 |
| 6,907,125 B1 * | 6/2005 | Oishi ............................ | 380/239 |
| 7,388,958 B1 * | 6/2008 | Maier ........................... | 380/270 |
| 2004/0120404 A1 * | 6/2004 | Sugahara et al. ......... | 375/240.23 |
| 2008/0144650 A1 | 6/2008 | Boch et al. | |
| 2009/0125726 A1 * | 5/2009 | Iyer et al. ..................... | 713/189 |
| 2011/0010604 A1 * | 1/2011 | Hwang et al. ................ | 714/755 |
| 2011/0074552 A1 * | 3/2011 | Norair et al. ................. | 340/10.1 |
| 2012/0047339 A1 * | 2/2012 | Decasper et al. ............ | 711/162 |

OTHER PUBLICATIONS

Philips Semiconductors, "Highly Integrated ISO14443A Reader IC", Revision 3.2, MF RC500, Dec. 2005, pp. 1-139.
ISO-IEC, Information technology telecommunications and information exchange between systems near field communication interface and protocol (NFCIP-1), International Standard ISO/ICE, vo. 18092, No. 1st edition, Apr. 2004, pp. 1-66.
NXP Semiconductors, "AN 10833, MIFARE type identification procedure", Revision 3.2, 018432, Aug. 2011, pp. 1-17.
Silbermann, "Security analysis of contactless payment systems in practice", Ruhr-Universitat Bochum, Nov. 2009, pp. 1-100.

* cited by examiner

*Primary Examiner* — James C Kerveros
(74) *Attorney, Agent, or Firm* — Allen, Dyer, Doppelt, Milbrath & Gilchrist, P.A.

(57) ABSTRACT

The information bits and the parity bits are encrypted in a microcontroller and transmitted on a bus to a transceiver head which forms the frames to be transmitted on a channel from encrypted information bits and from encrypted parity bits received on the bus.

22 Claims, 7 Drawing Sheets

METHOD FOR TRANSMITTING AND RECEIVING ENCRYPTED DIGITAL INFORMATION WITH ENCRYPTED PARITY BITS AND RELATED SYSTEMS

FIELD OF THE INVENTION

The invention relates to the transmission of information from and/or to a transceiver device, in particular, a radio transceiver device, or radio head, for example, in the Near Field Communication field, better known to those skilled in the art by the name "NFC" (Near Field Communication), and notably, but not exclusively when this information is transmitted in encrypted form.

BACKGROUND OF THE INVENTION

Near Field Communication (NFC) is a wireless connectivity technology which allows communication over a short distance between electronic devices, such as, for example contactless smart chips and readers. NFC technology may be particularly suitable for connecting any type of user device and allows fast and easy communications.

Among the protocols usable in NFC technology there are the type A and type B protocols defined in the ISD-14 443 standard. In NFC technology, the transmission of information generally takes place in the form of frames, as is the case, for example, in the type A protocol of the ISO-14 443 standard.

The exchanged frames comprise data bits and parity bits. Conventionally, on transmission the parity bits are calculated by the transceiver head, from the data bits which actually have to be transmitted on the transmission channel and using a predetermined calculation rule, which is generally specific to the communications standard used. On reception, the received parity bits are checked by the transceiver head by carrying out a calculation of these parity bits from the received data bits using the calculation rule, and then a comparison of these calculated parity bits with the parity bits extracted from the received frames.

There are, moreover, communication protocols also using transmission frames, but within which the data bits are encrypted. Moreover, the parity bits are calculated not from the encrypted data bits which will actually be transmitted but from the non-encrypted data bits, and then these parity bits thus calculated are then encrypted.

Despite this specific calculation and this encryption of the parity bits, some of these protocols remain compatible with the ISO-14 443 standard, notably at the level of the structure of the transmission frames. This is the case, for example, for the communications protocol known by its registered trade name MIFARE®. Information on this protocol is disclosed in the document published by the NXP Semiconductors company entitled "AN 10833, MIFARE type identification procedure" rev 3.2, 29 Aug. 2011, 018432. Other details about this protocol are provided, for example, in the document by Michael Silbermann entitled "Security Analysis of Contactless Payment Systems in Practice", 2 Nov. 2009, Ruhr-Universität Bochum.

The use of such encrypted transmission protocols is incompatible with the use of conventional transceiver heads notably because of the specific calculation and encryption of the parity bits. It is therefore necessary to develop specific transceiver heads incorporating the encryption/decryption algorithm, and the calculation and checking of the parity bits specific to such transmission protocols.

Moreover, the digital information to be transmitted is typically generated by a host microcontroller, and transmitted in plaintext on a bus to the transceiver head, which represents a weak point with regard to security.

SUMMARY OF THE INVENTION

According to an implementation and embodiment, there is proposed a method of transmitting and receiving encrypted information together with encrypted parity bits, for example, according to the MIFARE® protocol, having enhanced security and usable with a transceiver head having a conventional structure compatible with a transmission and reception of non-encrypted information.

According to an aspect, there is proposed a method for transmitting information by an integrated transceiver device, for example, a radio transceiver head capable of encapsulating the information to be transmitted in the form of frames comprising blocks of bits of the information to be transmitted respectively followed by parity bits. The integrated transceiver device comprises a function of calculation of the parity bits from the information bits actually transmitted.

According to a general feature of this aspect, the integrated transceiver device is connected by a connecting bus to another integrated device, for example, a host microcontroller. The method comprises the setting of the integrated transceiver device and of the other integrated device in a first state comprising, within the other integrated device, a generation of the information to be transmitted, an encryption of this information and a generation of encrypted parity bits from the bits of the non-encrypted information, for example according to the MIFARE® protocol, a transmission on the bus of the bits of the encrypted information and of the encrypted parity bits, a deactivation of the function of calculation of the parity bits. Within the integrated transceiver device, the method includes a generation of the frames from the encrypted information bits and from the encrypted parity bits received on the bus.

Thus, according to this aspect, the encryption of the information and the generation of the encrypted parity bits are carried out in the host microcontroller (the encryption/decryption algorithm is, for example, stored in a protected read-only memory of the microcontroller), which allows an encrypted transmission on the connecting bus. Moreover, it is possible, subject to deactivation of the function of calculation of the parity bits within the transceiver head, to use a transceiver head of conventional structure which is then used in this configuration (with the function of calculation of the parity bits deactivated) not for calculating the parity bits, but for encapsulating the encrypted information and the encrypted parity bits received on the bus in transmission frames according to a predefined format, for example, that conforming with the ISO-14 443 standard.

According to another aspect, there is proposed a method of receiving information by an integrated transceiver device, for example, a radio type, the received information being encapsulated in the form of frames comprising blocks of bits of the information respectively followed by parity bits. The integrated transceiver device may comprise a function of calculation of the parity bits from the information bits actually received.

According to a general feature of this aspect, the integrated transceiver device is connected by a connecting bus to another integrated device, for example, a host microcontroller. The received information and parity bits are encrypted, for example, according to the MIRARE® protocol, and the method comprises the setting of the integrated transceiver device and of the other integrated device in a first state comprising a deactivation of the function of calculation of the parity bits, an extraction of the encrypted information bits and of the encrypted parity bits from the frames within the integrated transceiver device, a transmission on the bus of the bits of the encrypted information and of the encrypted parity bits; and within the other integrated device, a decryption of this information and a checking of the encrypted parity bits from the bits of the non-encrypted information.

Thus, according to this aspect, the decryption of the information and the checking of the encrypted parity bits are carried out in the host microcontroller, which allows an encrypted transmission on the connecting bus. Moreover, here again, it is possible, subject to deactivation of the function of calculation of parity bits within the transceiver head, to use a transceiver head of conventional structure which, in this configuration (with the calculation of parity bits function deactivated) is not used for checking the received parity bits but simply for extracting the encrypted information bits and the encrypted parity bits from the received frames and transmitting them on the connecting bus to the host microcontroller.

Although it is possible to transmit the encrypted information bits and the encrypted parity bits on the connecting bus in any way, it is particularly advantageous, notably for ease of hardware implementation and of interpretation, to transmit the encrypted information bits on the bus in the form of successive groups of bits respectively separated by separating groups of bits or parity groups. The encrypted parity bit associated with each group of bits then is contained within the parity group following the group of bits.

The groups of bits and the separating groups of bits are preferably bytes, which makes it possible to use a microcontroller having a conventional 8-bit central processing unit without carrying out data compression. This is particularly advantageous in terms of calculation time because such data compression uses a greater number of calculation cycles.

Moreover, the encrypted parity bit contained in a separating group is advantageously the most significant bit or the sign bit of the separating group, which makes it possible to determine its logic value very easily.

It is also possible to make the transceiver head operate in an entirely conventional manner when the parity bits are calculated in a conventional manner from the information bits, encrypted or not encrypted, actually transmitted on the transmission channel, for example, a radio channel. In fact it is then appropriate to reactivate the function of calculation of the parity bits within the transceiver device.

More precisely, according to one embodiment, the transmission method further comprises the setting of the integrated transceiver device and of the other integrated device in a second state (corresponding to a second operating mode or second configuration of the transceiver device) comprising within the other integrated device, for example, the host microcontroller, a generation of the information to be transmitted, a transmission on the bus of the bits of the generated information, an activation of the function of calculating parity bits; and within the integrated transceiver device, a generation of the frames from the information bits received on the bus and from the parity bits calculated by the function from these received bits.

Similarly, on reception, according to one implementation, the method further comprises the setting of the integrated transceiver device in a second state (corresponding to a second configuration of the transceiver device) comprising an activation of the function of calculation of the parity bits, an extraction of the information bits and of the parity bits from the frames within the integrated transceiver device, a checking of the parity bits using the function of calculation of the parity bits, and a transmission on the bus of the bits of the information and of the checked parity bits or of parity error indications.

According to another aspect, there is proposed an integrated transceiver device, forming, for example, a radio transceiver head, capable of encapsulating the information to be transmitted in the form of frames comprising blocks of bits of the information respectively followed by parity bits, and capable of extracting from the received frames the received information bits and the received parity bits.

According to a general feature of this aspect, the integrated transceiver device comprises an input/output port, means of calculation or calculation circuitry of the parity bits from the information bits actually transmitted or received having a first state (corresponding to a first operating mode or a first configuration of the transceiver device) in which they are deactivated, and processing means or a processor configured in order to, when the calculation means are in their first state, receive on the input/output port encrypted information bits and encrypted parity bits, generate the frames from the encrypted information bits and the encrypted parity bits received on the bus, extract the encrypted information bits and encrypted parity bits from the received frames and deliver them to the input/output port.

According to an embodiment, the encrypted information bits are received by and delivered to the input/output port in the form of successive groups of bits, for example bytes, respectively separated by separating groups of bits or parity groups, for example, bytes, and the encrypted parity bit associated with each group of bits is contained in the parity group following the group of bits. This parity bit is preferably the most significant bit of the parity group.

According to an embodiment, the means of calculation of the parity bits have a second state (corresponding to a second operating mode or to a second configuration of the transceiver device) in which they are activated, and the processing means are configured in order to, when the calculation means are in their second state, receive information bits on the input/output port, generate the frames from the information bits and the parity bits calculated by the calculation means, extract the information bits and the parity bits from the received frames, check the parity bits using the function of calculation of the parity bits and deliver the bits of the information and the checked parity bits or parity error indications to the input/output port.

According to another aspect, there is proposed a system comprising an integrated transceiver device such as defined above, and another integrated device, for example a host microcontroller, having an input/output port connected to the input/output port of the integrated transceiver device by a connecting bus, the other integrated device comprising processing means configured to, when the means of calculation of the parity bits are in their first state, generate and encrypt the information to be transmitted and the parity bits from the non-encrypted information bits, transmit the encrypted information and the encrypted parity bits on the connecting bus, receive encrypted information bits and encrypted parity bits coming from the connecting bus, and check the encrypted parity bits.

According to an embodiment, the other integrated device comprises control means or a controller configured to transmit a control signal to the integrated transceiver device, for example, a specific control frame, to set the means of calculation of the parity bits in their first state or their second state, that is to say to set the transceiver device into its first or second operating state (first or second configuration).

BRIEF DESCRIPTION OF THE DRAWINGS

Other advantages and features of the invention will become apparent on examination of the detailed description of implementations and embodiments, which are in no way limiting, and of the appended drawings in which.

DETAILED DESCRIPTION OF THE PREFERRED EMBODIMENTS

Figure 1:
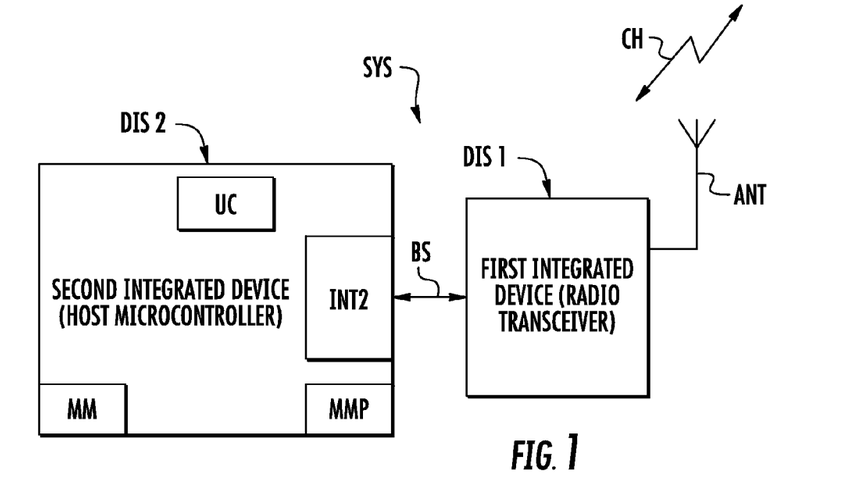
FIG. 1 is a schematic block diagram of a system in accordance with the invention.

In FIG. 1, the reference SYS denotes a system comprising a first integrated device DIS1 and a second integrated device DIS2. The devices DIS1 and DIS2 in this case are separate integrated circuits or chips, capable of exchanging information on a connecting bus BS.

In the example described here, the device DIS1 is a radio transceiver device, equipped with an antenna ANT and capable of transmitting and/or of receiving information on a transmission channel CH, in this case a radio transmission channel.

The information transmitted on the transmission channel CH is transmitted in the form of frames comprising blocks of bits of the said information, respectively followed by parity bits. These frames, in their structure, can for example conform with those described in the ISO-14 443A standard. The system SYS can thus have dialog with another equipment according to NFC technology.

The other integrated device DIS2 is, for example, a host microcontroller, for example, an NFC microcontroller, produced in the form of a chip, separate from the DIS1 chip. In the example described here, the microcontroller DIS2 is a microcontroller having a conventional 8-bit central processing unit UC, associated with various memories, one of which is a program memory MM.

Moreover, in the example described here, the microcontroller DIS2 also comprises an additional memory MMP, in this case a protected memory, comprising an algorithm for the encryption/decryption of the information to be transmitted, as well as an algorithm for calculating the parity bits and the encryption of these parity bits.

As a variant, the algorithm for encrypting/decrypting the information to be transmitted, as well as the algorithm for calculating the party bits and for encrypting these parity bits can be implemented by a hard-wired logic module incorporated in the microcontroller.

This algorithm for the encryption/decryption and for the calculation and encryption of the parity bits can, for example, be the one to implement the MIFARE® transmission protocol. This being so, any other type of encryption algorithm also providing a calculation of the parity bits not from the bits actually transmitted on the channel CH but from non-encrypted bits may be used.

While, according to the ISO-14 443 standard, for example, each transmitted byte is followed by a parity bit to detect the transmission errors, and calculated from the bits of the transmitted byte, the parity bits in the MIFARE® protocol are, as described for example in the abovementioned document by Michael Silbermann, calculated from the non-encrypted information bits (known by the English word "plaintext" which is well known by those skilled in the art). Then, these calculated parity bits are moreover encrypted. More precisely, the parity bit associated with the byte N can be encrypted with the same key bit as that used for encrypting the first bit of the following byte N+1.

Besides the means or circuitry which have just been described, the device DIS2 also comprises an interface INT2 with the bus BS, which can be for example an SPI, I2C, UART bus.

The radio transceiver head DIS1 has a conventional transceiver head structure, for example, compatible with the ISO-14 443A or B standard, or with the ISO-15 693 or ISO-18 092 standards, with a minor structural exception, which will be dealt with in greater detail below, concerning the activation or deactivation of the means of calculation of parity bits.

Figure 2:
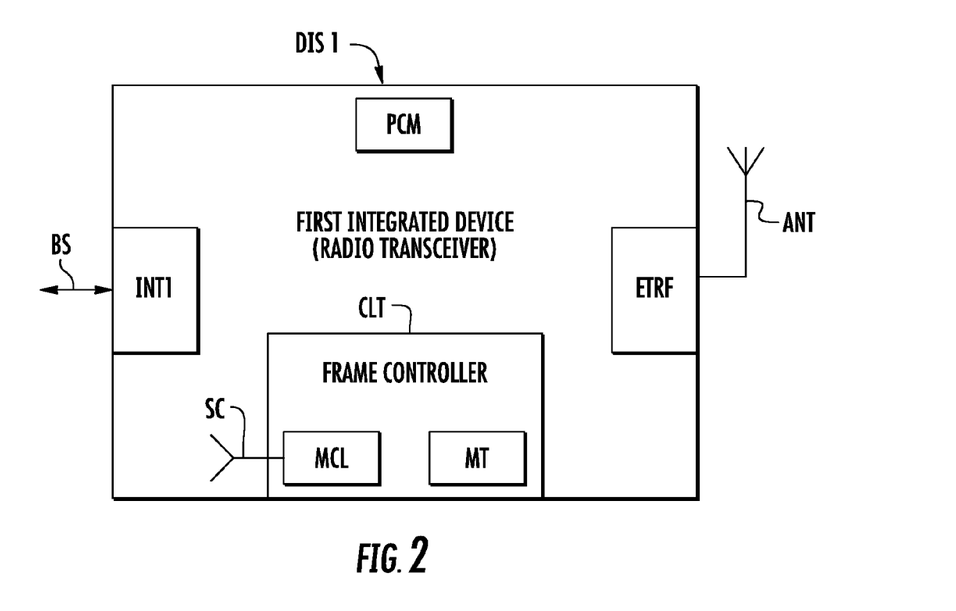
FIG. 2 is a more detailed schematic block of the first integrated device as show in FIG. 1.

Referring now more particularly to FIG. 2, it can be seen that the transceiver head DIS1 comprises an input/output port or interface INT1 with the connecting bus BS as well as a radio stage ETRF connected to the antenna ANT. The structure of the radio stage ETRF is conventional and known per se and notably comprises frame modulation/demodulation means or circuitry, as well as local oscillators making it possible to adjust the carrier frequency on the transmission channel CH.

The device DIS1 also comprises a frame controller CLT comprising the calculation circuitry or means of calculation of parity bits MCL, configured to calculate the parity bits according to a predefined logic function, for example, the one defined in the ISO-14 443 standard.

The frame controller CLT also comprises a processor or processing means capable, during transmission, of encapsulating the information bits and the parity bits within frames having a structure compatible with the one provided by the transmission standard used and, during reception, of extracting the information bits and the parity bits and possibly of checking them. The device DIS1 also conventionally comprises a power supply management module PCM.

As can moreover be seen in FIG. 2, the calculation means MCL can be activated or deactivated by a control signal SC transmitted, for example, by the microcontroller DIS2. This control signal SC can be formed by a specific control frame.

In fact, the activation or deactivation of the calculation means MCL corresponds to the first or second operating mode of the transceiver head DM, that is to say to a first or to a second configuration of this transceiver head.

More precisely, when the calculation means MCL are activated, corresponding to a second operating state of the head DIS1, the latter behaves in an entirely conventional manner and will notably, as will be seen in greater detail below, calculate and check the parity bits in accordance, for example, with the ISO-14 443 standard, from the information bits actually transmitted or received.

On the other hand, when the calculation means MCL are deactivated, corresponding to a first operating mode of the head DIS1, the processing means MT of the frame controller will simply generate, during transmission, the frames compatible with the ISO-14 443 standard, for example, from the encrypted information bits and from the encrypted parity bits received on the connecting bus BS. During reception, the processing means will not check the received encrypted parity bits but will simply extract the encrypted information and the encrypted parity bits from the received frames and transmit them, via the interface INT1, on the connecting bus BS to the microcontroller DIS2, which will carry out the decryption of the information and of the parity bits and the checking of them.

It is appropriate to note here that this structural modification (activation or deactivation of the means of calculation of the parity bits) can be carried out very simply by a modification of the execution program contained in the program memory of the frame controller.

Figure 3:
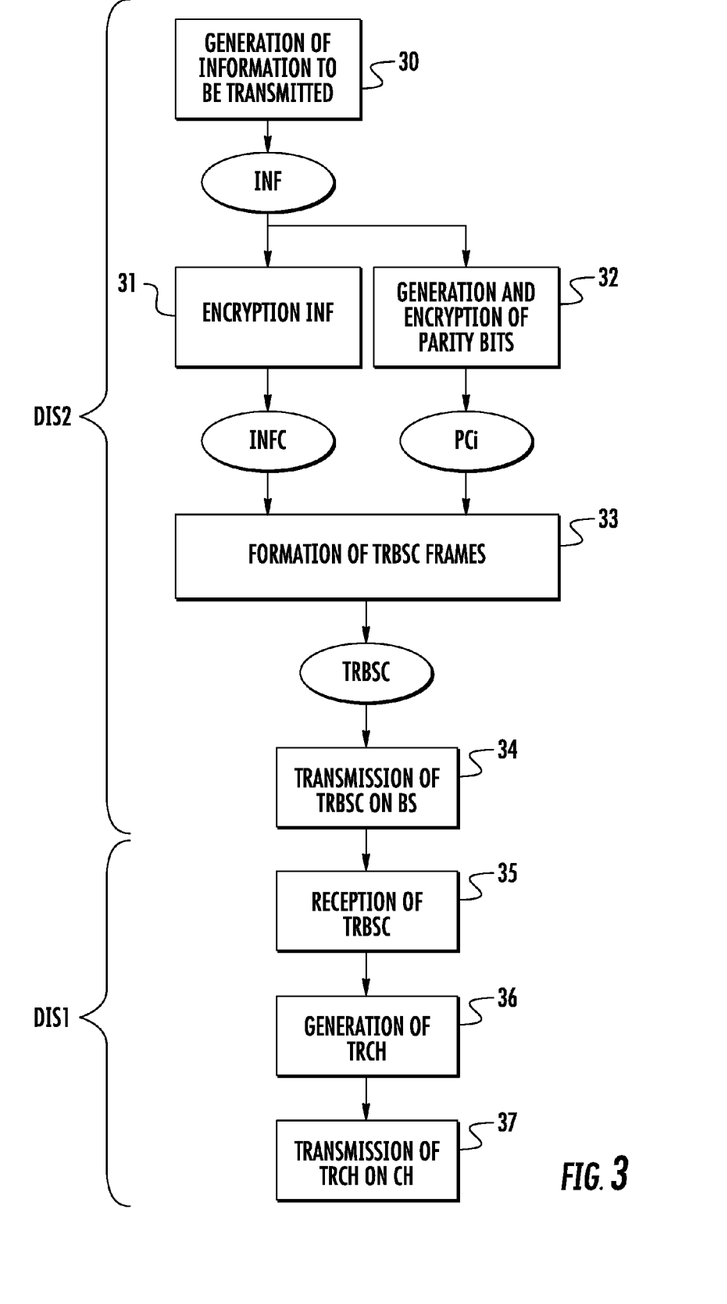
FIG. 3 is a flowchart of a method in accordance with the invention.

Reference will now be made to the flowchart of FIG. 3 to illustrate a first implementation of the method according to an embodiment.

It is assumed here that the host microcontroller DIS2 has set the transceiver head into its first operating mode, that is to say with the means of calculation MCL of parity bits are deactivated.

In fact, in this implementation, the information to be transmitted on the transmission channel CH is encrypted as well as their parity bits, for example, according to the MIFARE® protocol.

In a step 30, the microcontroller DIS2 firstly generates the information to be transmitted, according to the contactless application chosen, and stored, for example, in a secure element, such as, for example a SIM card, or in a secure section of the memory of the microcontroller.

The processing means of the microcontroller DIS2 (central processing unit UC and protected memory MMP) then carry out an encryption of the information INF to be transmitted (step 31) and generate and encrypt the corresponding parity bits (step 32) using the MIFARE® encryption algorithm.

The encrypted information bits INFC and the encrypted parity bits PCi are then transmitted in the form of TRBSC frames on the connecting bus BS.

More precisely, the processing means will firstly form the TRBSC frames (step 33).

Figure 4:
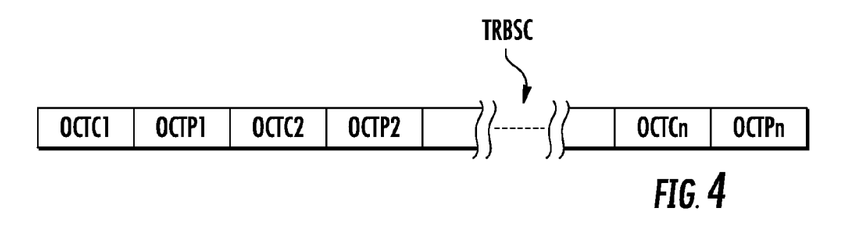
FIG. 4 is a schematic diagram of a frame as used in the method illustrated in FIG. 3.

An example of such a TRBSC frame is illustrated diagrammatically in FIG. 4.

Figure 5:
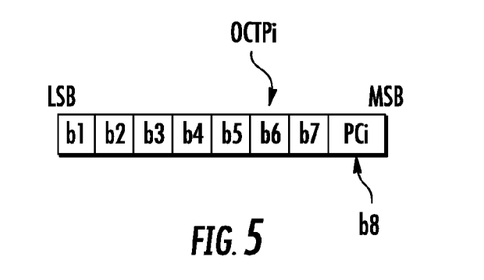
FIG. 5 is a schematic diagram of a byte in the frame of FIG. 4.

The encrypted information bits are transmitted in the form of bytes OCTC1-$n$. Moreover, each byte OCTCi is separated by a separating byte or parity byte OCTPi which, as shown in FIG. 5, contains the encrypted parity bit PCi associated with the information byte OCTCi which precedes it.

More precisely, in the example described here, the encrypted parity bit PCi is the most significant bit (MSB) b8.

The other bits b1-b7 can be of any value.

Such a transmission of encrypted parity bits makes it possible to fully use the 8-bit structure of the microcontroller without carrying out data compression, which greatly simplifies the embodiment and avoids increasing the number of calculation cycles. Moreover, the fact of placing the encrypted parity bit in the position of the most significant bit, which is generally the sign bit, makes it possible to determine the value very readily and very easily in a conventional manner.

The TRBSC frames thus formed are transmitted (step 34) on the connecting bus BS to the transceiver head DIS1.

The latter receives the TRBSC frames (step 35) at the input/output port INT1 and the processing means MT of the frame controller CLT then generate the transmission frames TRCH for transmission on the transmission channel CH.

Figure 6:
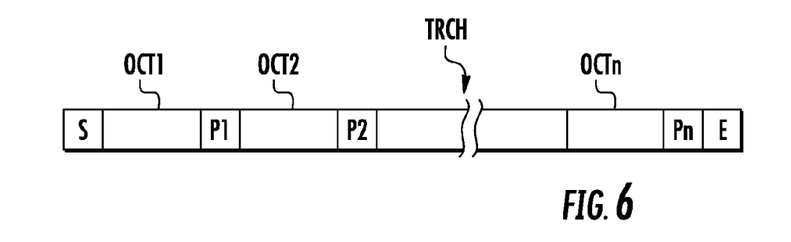
FIG. 6 is a schematic diagram of a frame structure used in accordance with the invention.

In the example described here, the frames TRCH are compatible with the ISO-14 443A transmission standard, whose structure is shown in FIG. 6.

More precisely, a TRCH frame starts with a header S (Start of frame) and ends with an end of frame indication E (End of frame).

The bytes OCTi containing the information bits to be transmitted are located between the S and E indications. Moreover, each byte is followed by a parity bit Pi.

The processing means MT of the frame controller CLT of the transceiver head DIS1 will consequently form the TRCH frames by extracting the bytes OCTCi representative of the encrypted information bits received in the TRBSC frames in order to place them instead and in place of the bits OCTi (FIG. 6). They will moreover extract from the separating bits OCTPi the corresponding encrypted parity bits PCi in order to insert them between the bytes OCTCi in the TRCH frames.

These frames will then be delivered to the radio transmission stage ETRF to be transmitted (step 37) on the transmission channel CH.

Figure 7:
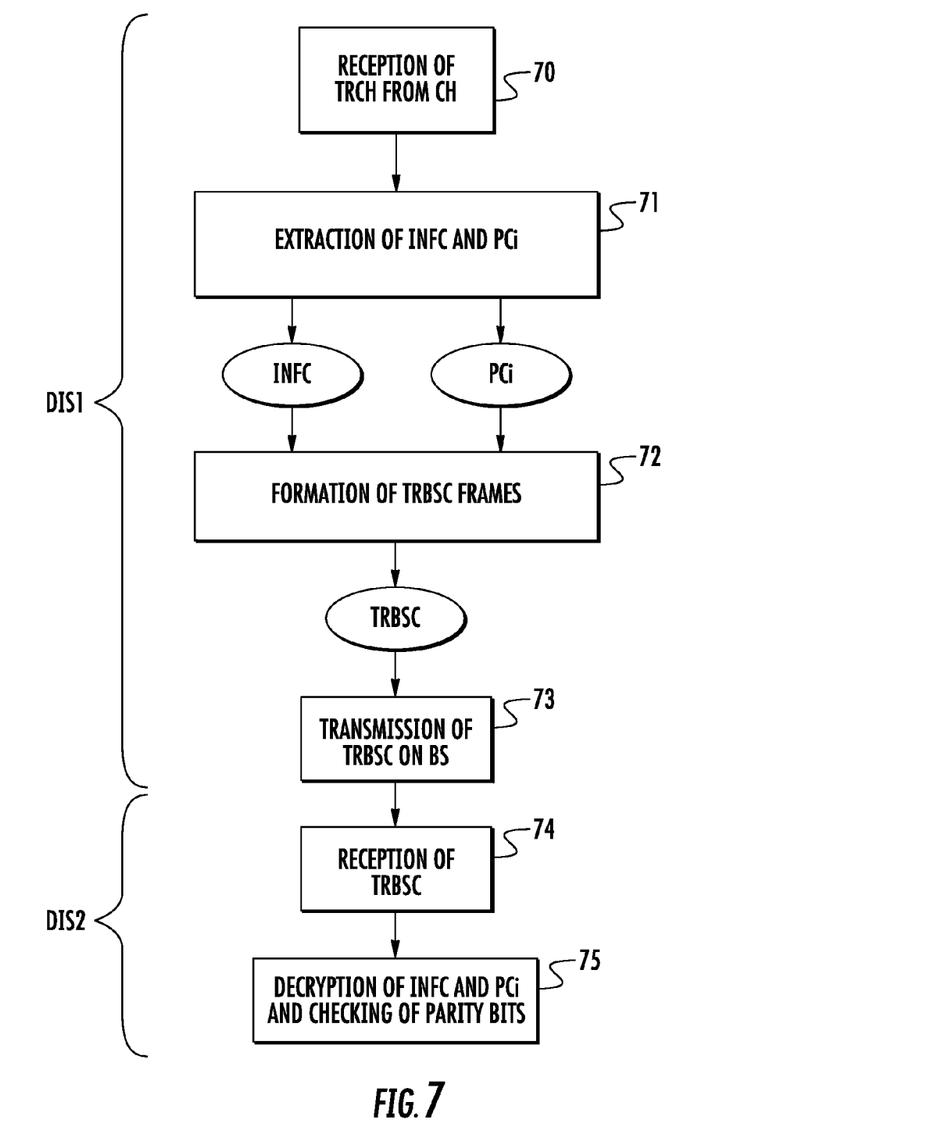
FIG. 7 is a flowchart of a method in accordance with the invention.

An example of implementation with regard to the reception of encrypted information and parity bits is shown in FIG. 7.

After reception (step 70) of a TRCH frame coming from the transmission channel CH, the processing means of the frame controller CLT extract (step 71) the encrypted information bits INFC and the encrypted parity bits PCi and form (step 72) the TRBSC frames (FIG. 4) in a way similar to that which was described previously.

The TRBSC frames are then transmitted (step 73) on the connecting bus BS to the microcontroller DIS2.

The latter receives (step 74) the TRBSC frames and the processing means of the microcontroller then carry out a decryption (step 75) of the encrypted information bits and of the encrypted parity bits and also carry out a checking of these parity bits, typically by recalculating them and by comparing the recalculated parity bits with those actually received.

As mentioned before, the radio transceiver head DIS1 can also be used in a conventional manner for transmitting information according for example to the ISO-14 443 type A standard, but with a conventional calculation of parity bits.

In this respect, the transceiver head DIS1 will be set in its second operating mode, that is to say with an activation of the parity bits calculation means MCL.

Figure 8:
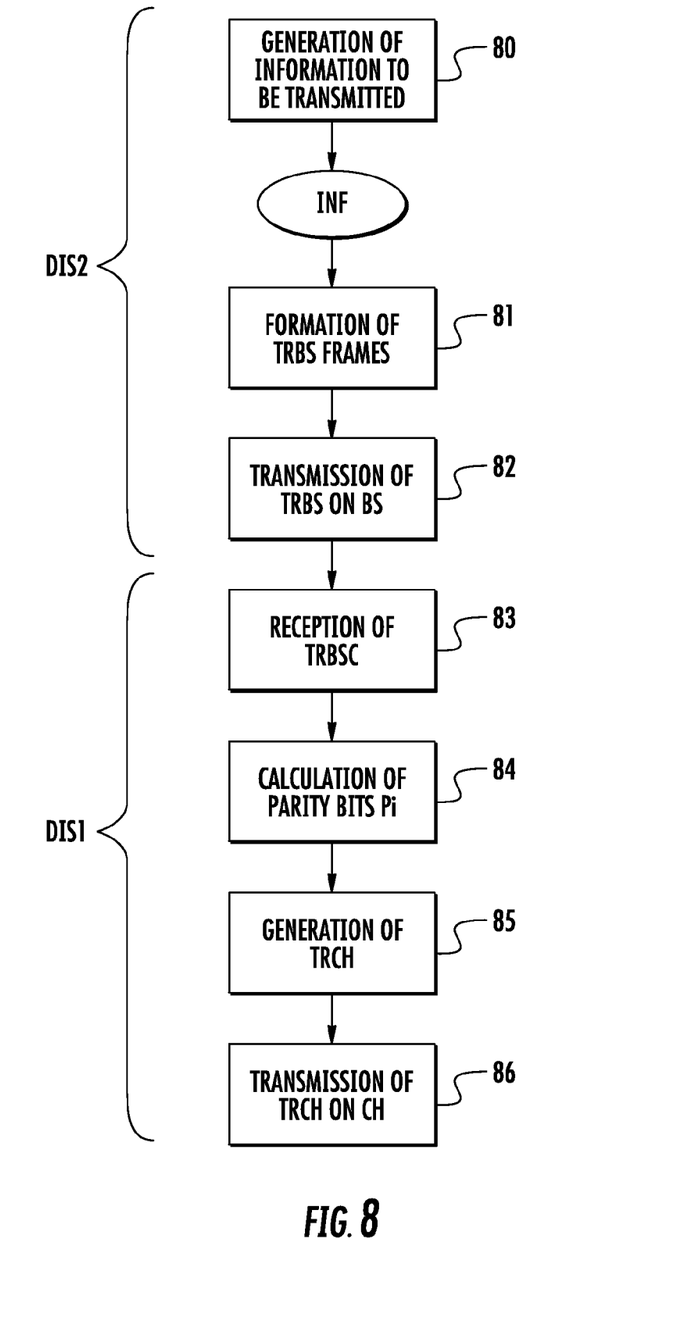
FIG. 8 is another flowchart of a method in accordance with the invention.

An example of implementation of the transmission method in such a case is illustrated in FIG. 8.

The information to be transmitted INF is firstly generated (step 80) by the host microcontroller DIS2 and then this information is here again transmitted on the connecting bus BS to the transceiver head DIS1 in the form of TRBS frames which are formed in a step 81.

Figure 9:
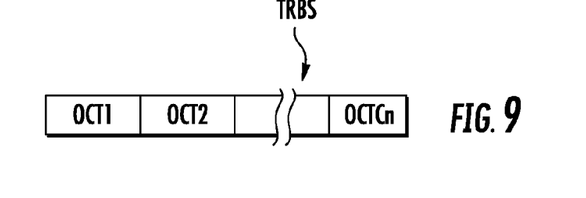
FIG. 9 is a schematic diagram of another frame structure used in accordance with the invention.

With regard to this, an example of TRBS frames is illustrated diagrammatically in FIG. 9. In this figure it can be seen that the bytes OCTi of the information INF are transmitted one after the other without the insertion of any parity bits whatsoever.

After transmission (step 82) of the TRBS frames on the connecting bus BS, they are received (step 83) by the radio transceiver head DIS1.

The parity bits Pi are then calculated (step 84) by the calculation means MCL in accordance with the transmission standard used. Thus, in the case where the 14 443 type A standard is used, the transmission is carried out with odd parity.

More precisely, the result of the logic function XOR on the bits of the data byte together with the parity bit must be odd.

Once the parity bits have been calculated, the TRCH frames are generated by the frame controller CLT in such a way as to exhibit the structure shown in FIG. 6 (step 85). The TRCH frames thus formed are then delivered to the ETRF stage for transmission (step 86) on the transmission channel CH via the antenna ANT.

On reception (FIG. 10), after reception of the TRCH frames (step 100), the processing means MT of the device DIS1 extract (step 101) the information bits INF and the parity bits Pi, and proceed (step 102) with a checking of the parity bits. With regard to this, the calculation means MCL conventionally recalculate the parity bits Pi from the information bits INF and the processing means compare these recalculated parity bits with the parity bits actually received in order to detect a possible transmission error.

Figure 10:
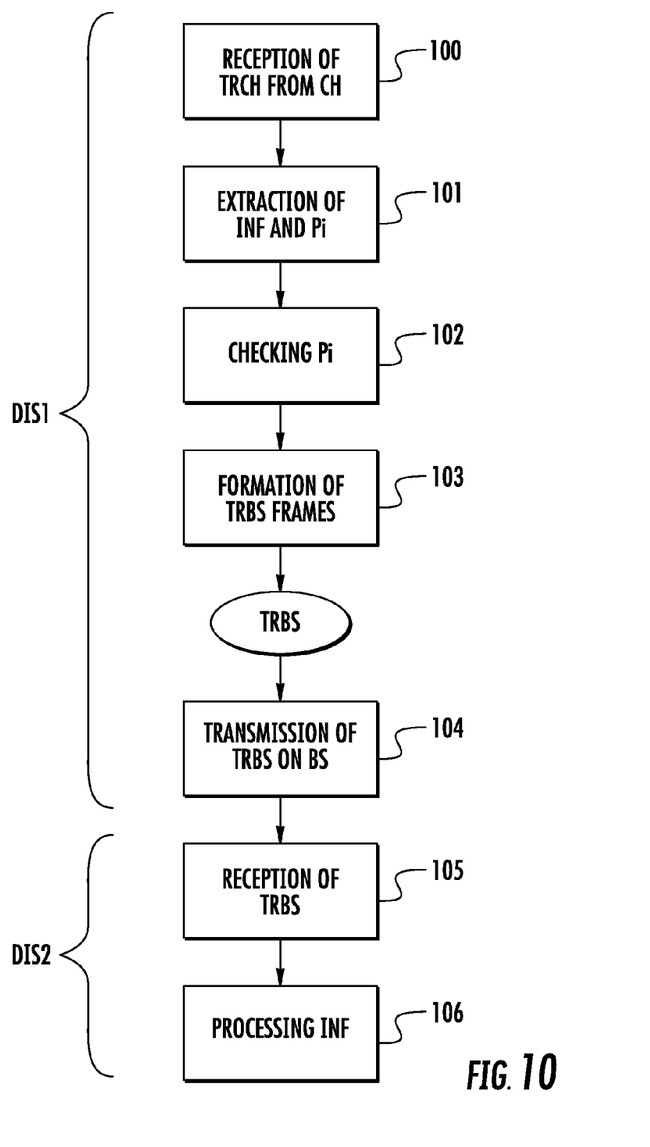
FIG. 10 is yet another flowchart of a method in accordance with the invention.

Then, the TRBS frames (FIG. 9) are formed (step 103) by the processing means MT and are transmitted (step 104) on the connecting bus BS. These frames contain the checked and therefore correct parity bits or error indications (codes) if one or more parity bits have been detected as erroneous after checking.

The host microcontroller DIS2 receives (step 105) the TRBS frames and carries out the processing of the information INF (step 106).

Figure 11:
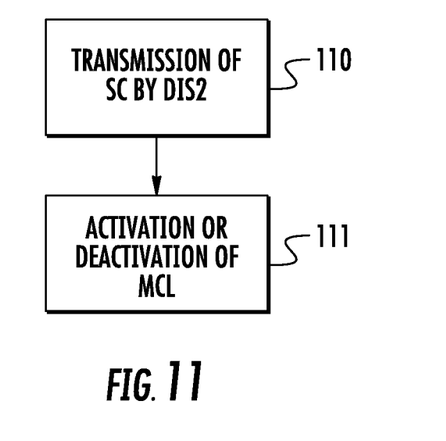
FIG. 11 is still another flowchart of a method in accordance with the invention.

As mentioned above, the setting of the transceiver head in its first or in its second operating mode can depend on the control signal SC delivered by the control means formed, for example, in a software manner within the host microcontroller DIS2. The transmission of the control signal SC (step 110, FIG. 11) can be realized by the transmission on the bus BS of a specific control frame. On reception of this specific control frame, the parity bit calculation means MCL of the frame controller CTL of the transceiver head can then be activated or deactivated (step 111).

That which is claimed is:

1. A method for transmitting information in a system comprising a first integrated near field communication (NFC) transceiver device, a second integrated device, and a bus coupled between the first integrated NFC transceiver device and the second integrated device, the first integrated NFC transceiver device transmitting the information in the form of frames comprising blocks of bits of the information respectively followed by parity bits, the first integrated NFC transceiver device comprising a function of calculation of the parity bits from information to be transmitted, the method comprising:
    setting the first integrated NFC transceiver device and the second integrated device in a first state comprising
        within the second integrated device, generating the information to be transmitted, encrypting the information to be transmitted and generating encrypted parity bits from bits of non-encrypted information, transmitting on the bus the bits of the encrypted information and the encrypted parity bits, and deactivating of the function of calculation of the parity bits, and
        within the first integrated NFC transceiver device, generating the frames from the encrypted information bits and from the encrypted parity bits received on the bus.

2. The method according to claim 1, wherein the encrypted information bits are transmitted on the bus in a form of successive groups of bits respectively separated by separating groups of bits, and the encrypted parity bit associated with each group of bits is contained within a separating group following the group of bits.

3. The method according to claim 2, wherein the groups of bits and the separating groups of bits comprise bytes.

4. The method according to claim 2, wherein the encrypted parity bit contained in a separating group is a sign bit of the separating group.

5. The method according to claim 1, further comprising the setting of the first integrated NFC transceiver device and of the second integrated device in a second state comprising:
    within the second integrated device, generating the information to be transmitted, transmitting on the bus the bits of the generated information, activating the function of calculating parity bits; and
    within the first integrated NFC transceiver device, generating the frames from the information bits received on the bus and from the parity bits calculated by the function from these received bits.

6. A method of receiving information in a system comprising a first integrated near field communication (NFC) transceiver device, a second integrated device, and a bus coupled between the first integrated NFC transceiver device and the second integrated device, the method comprising:
    receiving, with the first integrated NFC device, the information in the form of frames comprising blocks of bits of the information respectively followed by parity bits, the first integrated NFC transceiver device comprising a function of calculation of the parity bits from the information bits received, the received information and parity bits being encrypted;
    setting the first integrated NFC transceiver device and the second integrated device in a first state for deactivating the function of calculation of the parity bits;
    extracting the encrypted information bits and the encrypted parity bits from the frames within the first integrated NFC transceiver device;
    transmitting on the bus the bits of the encrypted information and the encrypted parity bits; and
    within the second integrated device, decrypting the encrypted information and the encrypted parity bits and checking the non-encrypted parity bits from the bits of the non-encrypted information.

7. The method according to claim 6, wherein the encrypted information bits are transmitted on the bus in a form of successive groups of bits respectively separated by separating groups of bits, and the encrypted parity bit associated with each group of bits is transmitted within the separating group following the group of bits.

8. The method according to claim 7, wherein the groups of bits and the separating groups of bits comprise bytes.

9. The method according to claim 7, wherein the encrypted parity bit contained in a separating group is a sign bit of the separating group.

10. The method according to claim 6, further comprising setting the first integrated wireless transceiver device in a second state and comprising activating the function of calculation of the parity bits, extracting the information bits and the parity bits from the frames within the first integrated wireless transceiver device, checking the parity bits using the function of calculation of the parity bits, and transmitting on the bus the bits of information and checked parity bits or parity error indications.

11. A first integrated near field communication (NFC) transceiver device capable of forming information to be transmitted in a form of frames comprising blocks of bits of information respectively followed by parity bits, and capable of extracting from received frames received information bits and received parity bits, the first integrated NFC transceiver device comprising:
- an NFC input/output port;
- calculation circuitry configured to calculate the parity bits from the information bits transmitted or received and having a first state in which it is deactivated; and
- a processor configured to, when the calculation circuitry is in the first state,
  - wirelessly receive on said NFC input/output port encrypted information bits and encrypted parity bits,
  - generate the frames from the encrypted information bits and the encrypted parity bits received, and
  - extract the encrypted information bits and encrypted parity bits from the received frames and deliver them to said NFC input/output port for transmission via a bus to a second integrated device, the second integrated device to decrypt the encrypted information bits and encrypted parity bits.

12. The first integrated NFC transceiver device according to claim 11, wherein the encrypted information bits are received by and delivered to said NFC input/output port in a form of successive groups of bits, respectively separated by separating groups of bits, and the encrypted parity bit associated with each group of bits is contained in the separating group following the group of bits.

13. The first integrated NFC transceiver device according to claim 12, wherein the groups of bits and the separating groups of bits comprise bytes.

14. The first integrated NFC transceiver device according to claim 12, wherein the encrypted parity bit contained in a separating group is a sign bit of the separating group.

15. The first integrated NFC transceiver device according to claim 11, wherein said calculation circuitry has a second state in which it is activated, and said processor is configured to, when the calculation circuitry is in the second state, receive information bits on said NFC input/output port, generate the frames from the information bits and the parity bits calculated by said calculation circuitry, extract the information bits and the parity bits from the received frames, check the parity bits using a function of calculation of the parity bits, and deliver the bits of the information and the checked parity bits or parity error indications to said NFC input/output port.

16. The first integrated NFC transceiver device according to claim 11, further comprising a radio transceiver head.

17. A system comprising:
- a first integrated near field communication (NFC) transceiver device capable of forming information to be transmitted in a form of frames comprising blocks of bits of information respectively followed by parity bits, and capable of extracting from received frames received information bits and received parity bits, the first integrated NFC transceiver device comprising
  - an input/output port,
  - calculation circuitry configured to calculate the parity bits from the information bits transmitted or received and having a first state in which it is deactivated, and
  - a processor configured to, when the calculation circuitry is in the first state,
    - wirelessly receive on said input/output port encrypted information bits and encrypted parity bits,
    - generate the frames from the encrypted information bits and the encrypted parity bits received on a bus, and
    - extract the encrypted information bits and encrypted parity bits from the received frames and deliver them to said input/output port;
- a connecting bus; and
- a second integrated device comprising an input/output port coupled to said input/output port of said first integrated NFC transceiver device by said connecting bus;
- said second integrated device comprising a processor configured to, when said calculation circuitry is in the first state,
  - generate and encrypt the information to be transmitted and the parity bits from the non-encrypted information bits, transmit the encrypted information and the encrypted parity bits on said connecting bus, and receive encrypted information bits and encrypted parity bits coming from said connecting bus, and check the encrypted parity bits.

18. The system according to claim 17, wherein the encrypted information bits are transmitted on said connecting bus in a form of successive groups of bits respectively separated by separating groups of bits, and the encrypted parity bit associated with each group of bits is contained within the separating group following the group of bits.

19. The system according to claim 18, wherein the groups of bits and the separating groups of bits are bytes.

20. The system according to claim 18, wherein the encrypted parity bit contained in a separating group is a sign bit of the said separating group.

21. The system according to claim 17, wherein said second integrated device comprises a controller configured to transmit a control signal to said first integrated NFC transceiver device to set said calculation circuitry of the parity bits.

22. The system according to claim 17, wherein said second integrated device comprises a microcontroller.

\* \* \* \* \*